(12) United States Patent
Mitsuda et al.

(10) Patent No.: US 12,153,894 B2
(45) Date of Patent: Nov. 26, 2024

(54) GENERATING DEVICE, GENERATING METHOD, AND PROGRAM

(71) Applicant: NIPPON TELEGRAPH AND TELEPHONE CORPORATION, Tokyo (JP)

(72) Inventors: Ko Mitsuda, Musashino (JP); Ryuichiro Higashinaka, Musashino (JP); Yushi Aono, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 310 days.

(21) Appl. No.: 17/756,656

(22) PCT Filed: Dec. 11, 2019

(86) PCT No.: PCT/JP2019/048479
§ 371 (c)(1),
(2) Date: May 30, 2022

(87) PCT Pub. No.: WO2021/117160
PCT Pub. Date: Jun. 17, 2021

(65) Prior Publication Data
US 2022/0414339 A1    Dec. 29, 2022

(51) Int. Cl.
*G06F 40/35* (2020.01)
*G06F 40/166* (2020.01)
(Continued)

(52) U.S. Cl.
CPC ............ *G06F 40/35* (2020.01); *G06F 40/166* (2020.01); *G06F 40/40* (2020.01); *G06N 20/00* (2019.01)

(58) Field of Classification Search
USPC ............................................... 704/7–10, 257
See application file for complete search history.

(56) References Cited

U.S. PATENT DOCUMENTS

2015/0371651 A1* 12/2015 Aharoni ............... G10L 13/027
704/201
2018/0068225 A1    3/2018 Miyoshi et al.
(Continued)

FOREIGN PATENT DOCUMENTS

JP    2018041336 A    3/2018

OTHER PUBLICATIONS

Jun. 30, 2020, International Search Report issued in the International Patent Application No. PCT/JP2019/048479.
(Continued)

*Primary Examiner* — Leonard Saint-Cyr
(74) *Attorney, Agent, or Firm* — XSENSUS LLP (57) ABSTRACT

A generation apparatus 100 includes: an argumentative scheme adding unit 10 which adds an argumentative scheme with respect to pair data constituted by an input utterance and a counter utterance 121 that voices a negative opinion with respect to the input utterance and which generates argumentative scheme-added pair data 122; a generation model learning unit 20 which learns a generation model for generating a counter utterance from an input utterance in consideration of the argumentative scheme by using the argumentative scheme-added pair data 122 as learning data and which generates a learned counter utterance generation model 123; and a counter utterance generating unit 30 which acquires an input utterance of a user and a designated argumentative scheme and which outputs a counter utterance using the counter utterance generation model 123.

6 Claims, 8 Drawing Sheets

(51) Int. Cl.
    G06F 40/40    (2020.01)
    G06N 20/00    (2019.01)

(56) References Cited

U.S. PATENT DOCUMENTS

2018/0357220 A1* 12/2018 Galitsky ................. G06F 40/30
2018/0357221 A1* 12/2018 Galitsky ............... G06F 40/289
2019/0138595 A1*  5/2019 Galitsky ................. G06F 40/35

OTHER PUBLICATIONS

Kazuaki Furumai et al., Investigation of automatic generation of supporting/opposing opinions in debate system, Acoustical Society of Japan 2019 Spring Research Presentation, Mar. 2019, pp. 957-960.
Koh Mitsuda et al., Generating supportive utterances for open-domain argumentative dialogue systems, IWSDS 2019, Apr. 24, 2019.
Oriol Vinyals et al., A neural conversational model, 31st International Conference on Machine Learning, Jul. 10, 2015.
Ryuichiro Higashinaka et al., Argumentative dialogue system based on argumentation structures, 21st Workshop on the Semantics and Pragmatics of Dialogue, Aug. 15, 2017, pp. 154-155.
Tatsuya Kawahara, A Brief History of Spoken Dialogue Systems—Evolution and Recent Technical Trend—, Journal of the Japanese Society for Artificial Intelligence, 2013, pp. 45-51, vol. 28, No. 1.

* cited by examiner

```
ANIME (ANIME) WANIHONNO (OF JAPAN) KOKORO (HEART) DESU (IS) NE (ISN'T IT?)
ANIME (ANIME) YORI (THAN) MANGA (MANGA) NOHOUGA (THAN) II (GOOD) DESU (IS)
KARAOKE (KARAOKE) WA (IS) SUTORESU (STRESS) KAISHO (RELIEF) NI NARI (BECOME) MASU
ON (TONE) CHI (DEAF) DA TO (WHEN BEING) TSU RA (TOUCH) KUNARI (BECOME) MASU (IS)
DORAIBU (DRIVE) NI IKI (GO) TAI (WANT) DESU NE (DON'T YOU?)
KURUMANO (OF CAR) UNTEN (DRIVING) WA TUKARE (FATIGUE) MASU
HANA (FLOWERS) WA (ARE) KI REI (PRETTY) DESU YO NE (AREN'T THEY?)
HANA (FLOWERS) WA SUGUNI (QUICKLY) KARE (WITHER) RU KARA (BECAUSE) IYA (DISLIKE) DESU
EIGA (MOVIES) WA EIGAKAN (MOVIE THEATER) DE (AT) MI (SEE) TAI (WANT)
RYOUKIN (PRICES) GA (ARE) TAKA (EXPENSIVE) SUGI (TOO) MASU (ARE)
SHOKU (MEAL) GONO (AFTER) NOMI (DRINK) MONO WA KOUCHA (TEA) GA II (GOOD) DESU (IS) NE
SHIBU (BITTER) I MONOMO (SOME) ARIMASU (THERE ARE)
DOKUSHO (READING BOOKS) WA NINGEN (PERSON) WO SEICHO (GROW) SASE (ENABLE) MASU
ME (EYES) GA TSUKARE (FATIGUE) TESHIMAI (CAUSE) MASU
MADO (WINDOWS) FU KI (WIPE) WA TUKARE (TIRING) MASU (IS)
ANA (YOU) TA WA KI REI (CLEAN) ZUKI (LIKE) DESU NE (AREN'T THEY?)
HANA (FLOWERS) WA (ARE) KI REI (PRETTY) DESU YO NE
HANA (FLOWERS) WA SUGU (QUICKLY) KARE (WITHER) TESHIMAI (END UP) MASU
EIGA (MOVIES) WA (ARE) TANOSHII (FUN) DESU
BUTAI (THEATER) NOHOUGA (IS MORE) OMOSHIROI (FUN) DESU
SOUGOUKAKUTOUGI (MIXED MARTIAL ARTS) WA (ARE) JI MI (UNSPECTACULAR) DAKE DO (BUT) FUKAI
(DEEP) DESU NE
BOKUSINGU (BOXING) TOKA (ETC.) NOHOUGA (IS MORE) II (PREFER) DESU KANE
DAIETTO (GOING ON A DIET) WA TURA (PAINFUL) SOU (SEEMS)
TAIJUU (WEIGHT) NO (OF) GENSHOU (LOSS) GA (IS) HAGE MI (MOTIVATION) NINARU (ACTS AS) WA
NEKO (CATS) WA (ARE) IYA (SOOTHING) SARERU
KURA (DARK) GA RI DE (IN THE) HIKA (SHINE) RU ME (EYES) GA KIMOCHI (FEEL) WARUI (CREEPY)
DESU (ARE) YO NE (AREN'T THEY?)
... ...
```

FIG. 3

```
def checker_comparison(utt):
    for keyword in ['HOUGA (BETTER)', 'HOUGA (BETTER)', 'DE JUUBUN (ENOUGH)',
                    'DE JUUBUN (ENOUGH)', 'DEII (OKAY)', 'MOTTO (MORE)', 'YORI (MORE)',
                    'ICHIBAN (NUMBER ONE)', 'NOGA (OF)', 'GA SAKI (HAS PRIORITY)']:
        if keyword in utt:
            return True
    return False def checker_exception(utt):
    for keyword in ['KOTO (MATTER)', 'BAAI (CASE)', 'DATO (AS)', 'MO (TOO)',
                    'TOKI (WHEN)', 'TOKIMO (ALSO WHEN)', 'TOKIGA (MOMENT)']:
        if keyword in utt:
            return True
    return False def checker_people(utt):
    for keyword in ['HITO (PERSON)', 'MINNA (EVERYONE)', 'KONOMI (TASTE)',
                    'ANATA (YOU)', 'SUKI (LIKE)', 'KIRAI (DISLIKE)']:
        if keyword in utt:
            return True
    return False def checker_consequence(utt):
    return True
```

FIG. 4

```
<comparison>  ANIME (ANIME) WANIHONNO (OF JAPAN)      ANIME (ANIME) YORI (THAN) MANGA (MANGA)
              KOKORO (HEART) DESU (IS) NE (ISN'T IT?)   NOHOUGA (THAN) II (GOOD) DESU (IS)
<consequence> KARAOKE (KARAOKE) WA (IS) SUTORESU (STRESS)    ON (TONE) CHI (DEAF) DA TO (WHEN BEING)
              KAISHO (RELIEF) NI NARI (BECOME) MASU           TSU RA (TOUGH) KUNARI (BECOME) MASU (IS)
<consequence> DORAIBU (DRIVE) NI IKI (GO) TAI            KURUMANO (OF CAR) UNTEN (DRIVING) WA
              (WANT) DESU NE (DON'T YOU?)               TUKARE (FATIGUE) MASU
<people>     ^HANA (FLOWERS) WA (ARE) KI REI             HANA (FLOWERS) WA SUGUNI (QUICKLY) KARE
              (PRETTY) DESU YO NE (AREN'T THEY?)^        (WITHER) RU KARA (BECAUSE) IYA (DISLIKE) DESU
<consequence> EIGA (MOVIES) WA EIGAKAN (MOVIE THEATER) DE (AT) MI (SEE) TAI (WANT)  RYOUKIN (PRICES) GA (ARE) TAKA (EXPENSIVE) SUGI (TOO) MASU (ARE)
              SHOKU (MEAL) GONO (AFTER) NOMI (DRINK) MONO    SHIBU (BITTER) I MONOMO (SOME)
<exception>   WA KOUCHA (TEA) GA II (GOOD) DESU (IS) NE      ARIMASU (THERE ARE)
<consequence> DOKUSHO (READING BOOKS) WA NINGEN (PERSON)  ME (EYES) GA TSUKARE (FATIGUE)
              WO SEICHO (GROW) SASE (ENABLE) MASU          TESHIMAI (CAUSE) MASU
<people>     ^MADO (WINDOWS) FU KI (WIPE) WA TUKARE (TIRING) MASU (IS)^  ANA (YOU) TA WA KI REI (CLEAN) ZUKI (LIKE) DESU NE (AREN'T THEY?)
              HANA (FLOWERS) WA (ARE) KI REI              HANA (FLOWERS) WA SUGU (QUICKLY)
<consequence> (PRETTY) DESU YO NE                        KARE (WITHER) TESHIMAI (END UP) MASU
              ^EIGA (MOVIES) WA (ARE)         BUTAI (THEATER) NOHOUGA (IS MORE)
<comparison>  TANOSHII (FUN) DESU             OMOSHIROI (FUN) DESU
              SOUGOUKAKUTOUGI (MIXED MARTIAL ARTS) WA (ARE) JI MI  BOKUSINGU (BOXING) TOKA (ETC.) NOHOUGA
<comparison>  (UNSPECTACULAR) DAKE DO (BUT) FUKAI (DEEP) DESU NE   (IS MORE) II (PREFER) DESU KANE
              DAIETTO (GOING ON A DIET) WA    TAIJUU (WEIGHT) NO (OF) GENSHOU (LOSS) GA (IS)
<consequence> TURA (PAINFUL) SOU (SEEMS)        HAGE MI (MOTIVATION) NINARU (ACTS AS) WA
<consequence> ^NEKO (CATS) WA (ARE)           KURA (DARK) GA RI DE (IN THE) HIKA (SHINE) RU ME (EYES)
              IYA (SOOTHING) SARERU^          GA KIMOCHI (FEEL) WARUI (CREEPY) DESU (ARE) YO NE (AREN'T THEY?)
```

FIG. 5

NEKO (CATS) TTE KAWAI (CUTE)
I DESU (ARE) YO NE (AREN'T THEY?)

FIG. 6

```
<comparison> NEKO (CATS) TTE KAWAI (CUTE) I
             DESU (ARE) YO NE (AREN'T THEY?)
<people>     NEKO (CATS) TTE KAWAI (CUTE) I
             DESU (ARE) YO NE (AREN'T THEY?)
<exception>  NEKO (CATS) TTE KAWAI (CUTE) I
             DESU (ARE) YO NE (AREN'T THEY?)
<consequence> NEKO (CATS) TTE KAWAI (CUTE) I
              DESU (ARE) YO NE (AREN'T THEY?)
```

FIG. 7

```
INU (DOGS) NO HOUGA (MORE)
KAWAI I (CUTE) DESU (ARE)
NEKO (CATS) WA KIRAI (DISLIKE)
DESU (ARE)
NEKO (CATS) WA KI MA GURE
(TEMPERAMENTAL) DESU (ARE)
NEKO (CATS) WA TSUME (CLAWS) DE
(WITH) HI KKAKI (SCRATCH) MASU
```

FIG. 8

GENERATING DEVICE, GENERATING METHOD, AND PROGRAM

TECHNICAL FIELD

The present disclosure relates to a generation apparatus, a generation method, and a program.

BACKGROUND ART

In recent years, dialogue systems in which a computer appropriately responds to an input utterance of a user are being actively developed. In a dialogue system, a user engages in a dialogue with a computer to obtain various pieces of information and to satisfy various needs. There are also dialogue systems which engage in everyday conversation in addition to accomplishing predetermined tasks, and a user may attain mental stability, satisfy desire for recognition, or establish a relationship of trust through such dialogue systems. For example, NPL 1 discloses types of dialogue systems.

In addition, research is underway in order to realize argumentation with a dialogue system. Argumentation plays an important role in a user in terms of changing how the user judges values and putting the user's thoughts in order. For example, NPL 2 discloses a dialogue system which engages in a discussion with a user by using graph data having opinions as nodes in order to map an input utterance of a user to a node and return a node in a connection relationship with the mapped node to the user as a system utterance. The graph data is manually created based on an argumentative topic set in advance (for example, "The city is a better place to live permanently than the countryside"). Using manually-created graph data enables argumentation with respect to a specific topic (closed domain) to be performed.

However, while the dialogue system disclosed in NPL 2 is capable of engaging in a deep discussion with respect to a specific topic, the dialogue system is incapable of providing an appropriate response to an input utterance by a user which deviates from an argumentative topic set in advance. While an approach involving creating, in advance, pieces of graph data for discussing arbitrary topics may conceivably be adopted, such an approach is unrealistic given that there are an infinite number of argumentative topics. Therefore, for example, NPL 3 discloses a dialogue system which utilizes an utterance generation model using deep learning in order to appropriately respond to even an input utterance of a user which deviates from an argumentative topic set in advance.

CITATION LIST

Non Patent Literature

[NPL 1] Tatsuya Kawahara, "A Brief History of Spoken Dialogue Systems: Evolution and Recent Technical Trend", Journal of the Japanese Society for Artificial Intelligence, Vol. 28, No. 1, 2013, p 45-51.

[NPL 2] Ryuichiro Higashinaka, et al., "Argumentative dialogue system based on argumentation structures", Proceedings of The 21st Workshop on the Semantics and Pragmatics of Dialogue, p 154-155, 2017.

[NPL 3] Oriol Vinyals, et al., "A neural conversational model", In: Proc. ICML Deep Learning Workshop, 2015.

SUMMARY OF THE INVENTION

Technical Problem

However, the dialogue system disclosed in NPL 3 has a problem in that, while an utterance generation model is learned using pair data constituted by an input utterance and an output utterance, it is difficult to control an output utterance in accordance with a methodology of argumentation. For example, when a person makes a rebuttal to an opposite party, methodologies of argumentation include voicing an opposing opinion (for example, in response to an opinion stating that "cats are cute", an opinion stating that "dogs are cuter") and voicing an opinion on faults (for example, in response to an opinion stating that "cats are cute", an opinion stating that "cats are not cute because they scratch with their claws"). As a solution to this problem, while a method of manually collecting pair data constituted by an input utterance and an output utterance and individually learning an utterance generation model for each methodology of argumentation is conceivable, problems arise such as a decline in performance due to division of learning data and an increase in collection cost of learning data.

An object of the present disclosure having been devised in consideration of the circumstances described above is to provide a generation apparatus, a generation method, and a program which are capable of generating a counter utterance in accordance with a methodology of argumentation.

Means for Solving the Problem

A generation apparatus according to an embodiment includes: an argumentative scheme adding unit which adds an argumentative scheme with respect to pair data constituted by an input utterance and a counter utterance that voices a negative opinion with respect to the input utterance and which generates argumentative scheme-added pair data; a generation model learning unit which learns a generation model for generating a counter utterance from an input utterance in consideration of the argumentative scheme by using the argumentative scheme-added pair data as learning data and which generates a learned counter utterance generation model; and a counter utterance generating unit which acquires an input utterance of a user and a designated argumentative scheme and which outputs a counter utterance using the counter utterance generation model.

A generation method according to an embodiment includes the steps of: adding an argumentative scheme with respect to pair data constituted by an input utterance and a counter utterance that voices a negative opinion with respect to the input utterance and generating argumentative scheme-added pair data; learning a generation model for generating a counter utterance from an input utterance in consideration of the argumentative scheme by using the argumentative scheme-added pair data as learning data and generating a learned counter utterance generation model; and acquiring an input utterance of a user and a designated argumentative scheme and outputting a counter utterance using the counter utterance generation model.

A program according to an embodiment causes a computer to function as the generation apparatus described above.

Effects of the Invention

According to the present disclosure, a generation apparatus, a generation method, and a program which are capable of generating a counter utterance in accordance with a methodology of argumentation can be provided.

BRIEF DESCRIPTION OF DRAWINGS

FIG. 2 is a diagram showing examples of pair data constituted by an input utterance and a counter utterance according to the present embodiment.

FIG. 4 is a diagram showing examples of pair data constituted by an argumentative scheme-added input utterance and a counter utterance according to the present embodiment.

DESCRIPTION OF EMBODIMENTS

Hereinafter, an embodiment of the present invention will be described in detail with reference to the drawings.

<Configuration of Dialogue System>

An example of a configuration of a dialogue system according to the present embodiment will be described with reference to FIG. 1.

Figure 1:
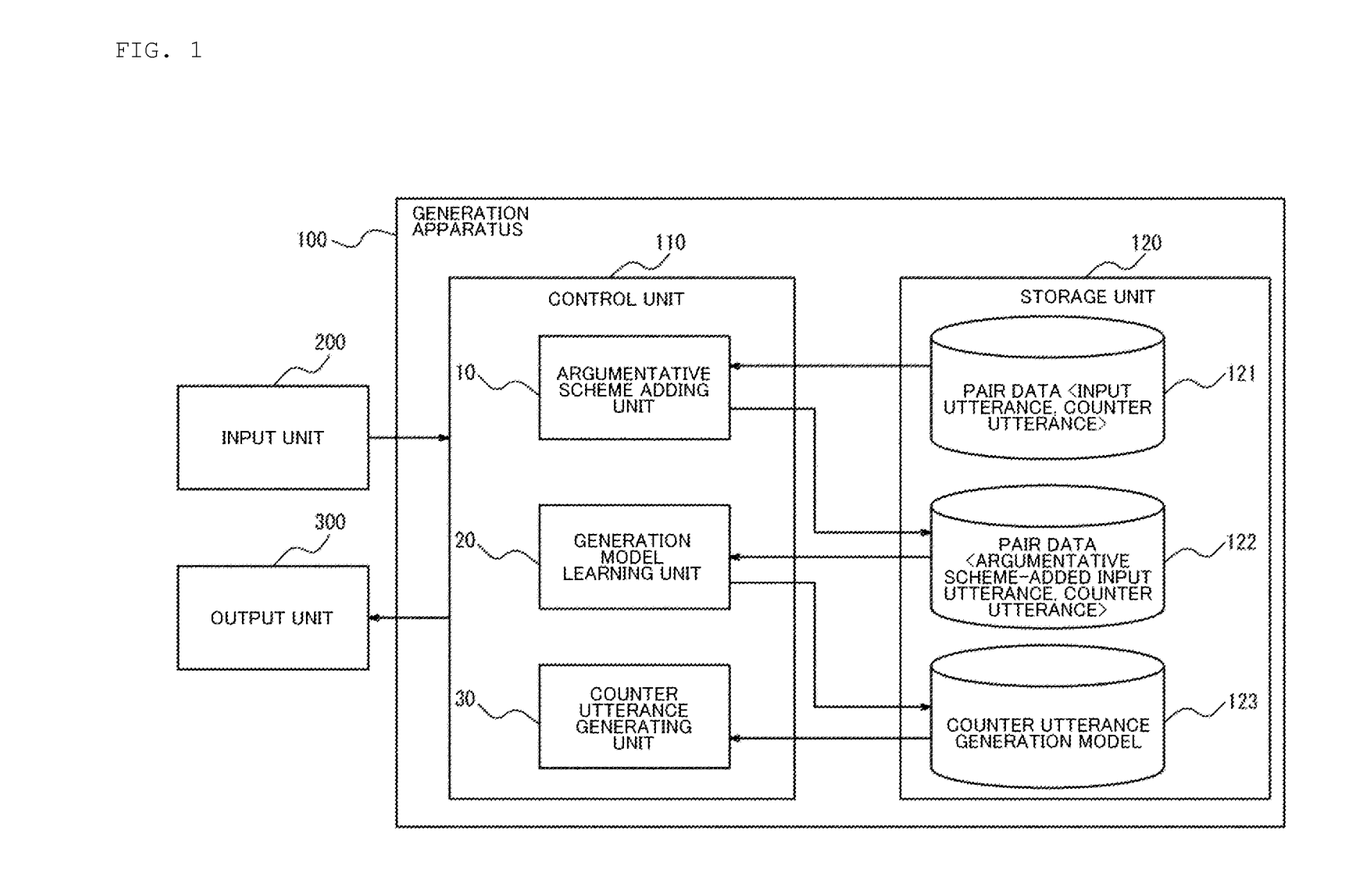
FIG. 1 is a diagram showing an example of a configuration of a dialogue system according to a present embodiment.

As shown in FIG. 1, a dialogue system 1 includes a generation apparatus 100, an input unit 200, and an output unit 300. The generation apparatus 100 includes a control unit 110 and a storage unit 120.

The generation apparatus 100 uses a learned counter utterance generation model (hereinafter, the learned counter utterance generation model will be simply referred to as a counter utterance generation model) to generate, based on an input utterance of a user (for example, a dialogue partner of the dialogue system) and a designated argumentative scheme, a predetermined counter utterance (a counter utterance in accordance with a methodology of argumentation). An input utterance refers to an utterance that states a positive or negative opinion with respect to a specific topic of which an example is "Cats are cute, aren't they?". A counter utterance refers to an utterance that voices an opinion counter to the input utterance of which an example is "They scratch with their claws".

The control unit 110 may be constituted by dedicated hardware or constituted by a general-purpose processor or a processor specialized for specific processing. While details will be provided later, the control unit 110 includes an argumentative scheme adding unit 10, a generation model learning unit 20, and a counter utterance generating unit 30.

The storage unit 120 includes one or more memories and may include, for example, a semiconductor memory, a magnetic memory, or an optical memory. Each memory included in the storage unit 12 may function as, for example, a main storage apparatus, an auxiliary storage apparatus, or a cache memory. Each memory need not necessarily be included inside the generation apparatus 100 and may be provided as an external component of the generation apparatus 100.

The storage unit 12 stores arbitrary information to be used to operate the generation apparatus 100. While details will be provided later, for example, the storage unit 120 stores pair data constituted by an input utterance and a counter utterance 121, pair data constituted by an argumentative scheme-added input utterance and a counter utterance 122, a counter utterance generation model 123, and the like. In addition, the storage unit 120 also stores, for example, various programs and data.

The input unit 200 accepts input of various types of information. The input unit 200 may be any kind of device as long as predetermined operations can be performed by a user, and examples thereof include a microphone, a touch panel, a keyboard, and a mouse. For example, the user performs a predetermined operation using the input unit 200 to input an input utterance of the user to the generation apparatus 100. The input unit 200 may be integrated with the generation apparatus 100.

The output unit 300 outputs various types of information. The output unit 300 is, for example, a speaker, a liquid crystal display, or an organic EL (Electro-Luminescence) display. For example, the output unit 300 reproduces a predetermined synthesized voice based on a predetermined counter utterance generated by the generation apparatus 100. For example, the output unit 300 displays a predetermined screen based on a predetermined counter utterance generated by the generation apparatus 100. The output unit 300 may be integrated with the generation apparatus 100.

The control unit 110 includes the argumentative scheme adding unit 10, the generation model learning unit 20, and the counter utterance generating unit 30. The storage unit 120 includes the pair data constituted by an input utterance and a counter utterance 121, the pair data constituted by an argumentative scheme-added input utterance and a counter utterance 122, and the counter utterance generation model 123.

The argumentative scheme adding unit 10 adds an argumentative scheme to the pair data constituted by an input utterance and a counter utterance 121 to generate the pair data constituted by an argumentative scheme-added input utterance and the counter utterance 122 (learning data). An argumentative scheme refers to away to present a typical supportive opinion or a typical rebuttal with respect to a specific opinion and signifies a methodology of argumentation. The input utterance and the counter utterance are respectively subjected to word segmentation processing to enable the generation model learning unit 20 to learn the counter utterance generation model 123. The argumentative scheme adding unit 10 outputs the generated pair data constituted by the argumentative scheme-added input utterance and the counter utterance 122 to the generation model learning unit 20.

FIG. 2 is a diagram showing examples of pair data constituted by an input utterance and a counter utterance.

As shown in FIG. 2, one piece of the pair data constituted by an input utterance and a counter utterance 121 is described in each row. A hat symbol represents a tab and is inserted between the input utterance and the counter utterance. The input utterance and the counter utterance are respectively subjected to word segmentation. For example, in the pair data constituted by an input utterance and a counter utterance 121 in a 1st row, the input utterance is subjected to word segmentation so as to read "Anime (anime) wa Nihon no (of Japan) kokoro (heart) desu (is) ne (isn't it?)" and the counter utterance is subjected to word segmentation so as to read "Anime (anime) yori (than) manga (manga) no hou ga (than) ii (good) desu (is)". For example, in the pair data constituted by an input utterance and a counter utterance 121 in the 1st row, the input utterance is subjected to word segmentation so as to read "Karaoke (karaoke) wa (is) sutoresu (stress) kaisho (relief) ni nari (become) masu" and the counter utterance is subjected to word segmentation so as to read "On (tone) chi (deaf) da to (when being) tsu ra ku nari (becomes tough) masu (is)".

A tool used to apply word segmentation to each utterance is not particularly limited and known tools may be used. Examples of such a tool include a learned model created by training sentencepiece on all articles of Wikipedia (https://ja.wikipedia.org/wiki/Wikipedia:download database). sentencepiece is suitable given its good compatibility with generation models.

For details on sentencepiece, for example, refer to the following document.

Kudo, Taku, et al., "Sentencepiece: A simple and language independent subword tokenizer and detokenizer for neural text processing," arXiv preprint arXiv: 1808.06226, 2018

For details on training methods, for example, refer to the following document.

Internet <URL: https://github.com/google/sentencepiece>

The argumentative scheme adding unit 10 selects an argumentative scheme to be added to the pair data constituted by an input utterance and a counter utterance 121 from a plurality of argumentative schemes based on a decision rule and adds the argumentative scheme to the pair data constituted by the input utterance and the counter utterance 121. Specifically, in accordance with Walton's argumentative schemes in which typical methodologies of argumentation are systematically organized, using a part of the argumentative schemes which can be automatically labeled, the argumentative scheme adding unit 10 adds a label of a predetermined argumentative scheme to the pair data constituted by the input utterance and the counter utterance 121 based on a decision rule (for example, the Python program) shown in FIG. 3.

For details on Walton's argumentative schemes, for example, refer to the following document.

Walton, D., "Methods of argumentation", Cambridge University Press, 2013

Figure 3:
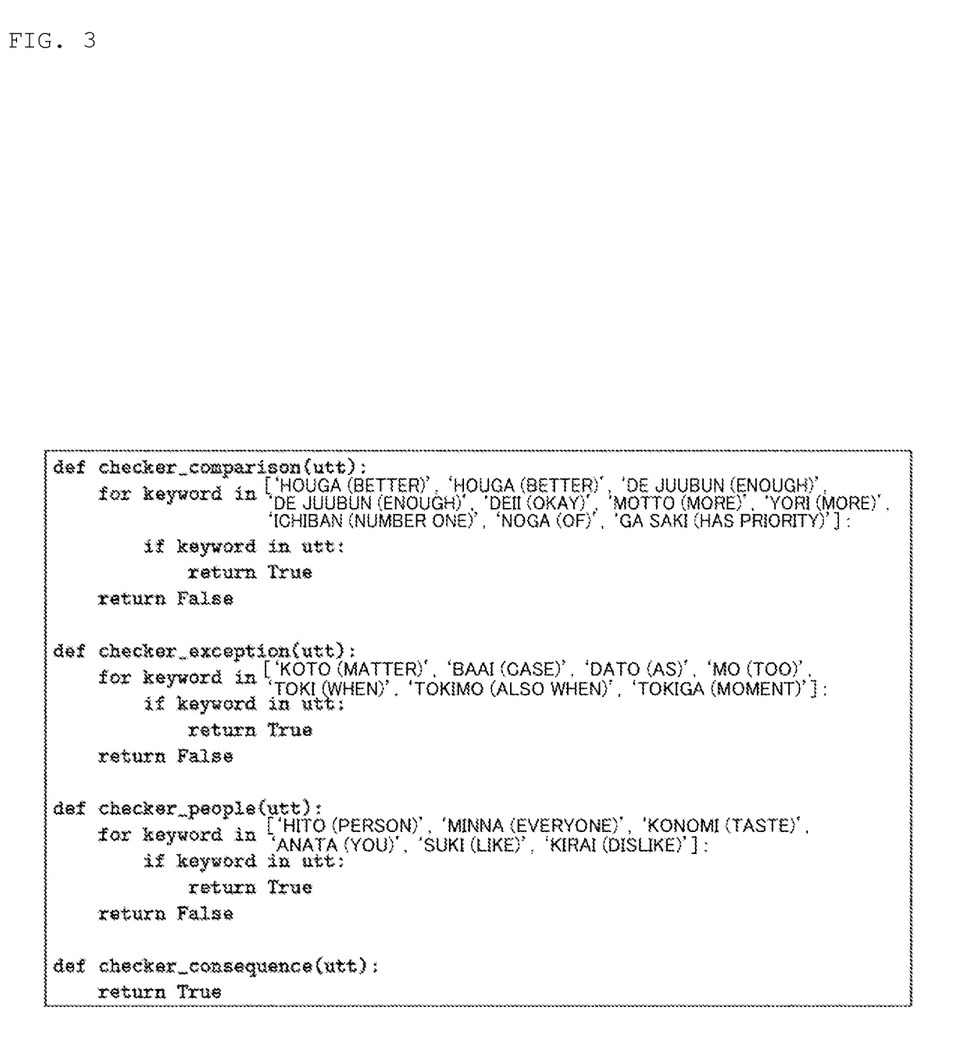
FIG. 3 is a diagram showing examples of a rule for adding an argumentative scheme to pair data constituted by an input utterance and a counter utterance according to the present embodiment.

FIG. 3 is a diagram showing examples of a rule for adding an argumentative scheme to pair data constituted by an input utterance and a counter utterance.

In a model proposed by Walton, examples of argumentative schemes include Argument from opposites (a rebuttal based on a comparison: comparison), Argument from exception (a rebuttal based on an exception: exception), Argument from popular opinion (a rebuttal based on popular opinion: people), and Argument from consequences (a rebuttal based on whether a consequence is right or wrong: consequence). Therefore, for example, labels of argumentative schemes added to the pair data constituted by the input utterance and the counter utterance 121 are classified into the following four types: <comparison>, <people>, <exception>, and <consequence>.

As shown in FIG. 3, "xxx" in checker_xxx (utt): respectively corresponds to the labels of the four argumentative schemes. "checker" is applied to a counter utterance and determines whether or not the counter utterance includes a specific keyword. When it is determined that the counter utterance includes a specific keyword, labels are added to the pair data constituted by the input utterance and the counter utterance 121 in a priority order of label <comparison>, label <people>, and label <exception>. This is because the decision rule is sequentially applied starting from a characteristic argumentative scheme that is readily determined. When it is determined that the counter utterance does not include the specific keyword, the table <consequence> is added to the pair data constituted by the input utterance and the counter utterance 121.

For example, when it is determined that the counter utterance includes specific keywords "'houga (better)', 'houga (better)', 'de juubun (enough)', 'de juubun (enough)', 'deii (okay)', 'motto (more)', 'yori (more)', 'ichiban (number one)', 'noga (of)', 'ga saki (has priority)'", the label <comparison> is added to the pair data constituted by the input utterance and the counter utterance 121.

For example, when it is determined that the counter utterance includes specific keywords "'koto (matter)', 'baai (case)', 'dato (as)', 'mo (too)', 'toki (when)', 'tokimo (also when)', 'tokiga (moment)'", the label <exception> is added to the pair data constituted by the input utterance and the counter utterance 121.

For example, when it is determined that the counter utterance includes specific keywords "'hito (person)', 'minna (everyone)', 'konomi (taste)', 'anata (you)', 'suki (like)', 'kirai (dislike)'", the label <people> is added to the pair data constituted by the input utterance and the counter utterance 121.

FIG. 4 is a diagram showing examples of pair data constituted by an argumentative scheme-added input utterance and a counter utterance.

As shown in FIG. 4, a predetermined label is added to the pair data constituted by the input utterance and the counter utterance 121 as an argumentative scheme and the pair data constituted by an argumentative scheme-added input utterance and the counter utterance 122 is generated. The predetermined label is described enclosed in brackets < > in a first column.

For example, the pair data constituted by the argumentative scheme-added input utterance and the counter utterance 122 in a 1st row is created by adding the label <comparison> to pair data constituted by an input utterance reading "Anime (anime) wa Nihon no (of Japan) kokoro (heart) desu (is) ne (isn't it?)" and a counter utterance reading "Anime (anime) yori (than) manga (manga) no hou ga (than) ii (good) desu (is)". For example, the pair data constituted by the argumentative scheme-added input utterance and the counter utterance 122 in a 2nd row is created by adding the label <consequence> to pair data constituted by an input utterance reading "Karaoke (karaoke) wa (is) sutoresu (stress) kaisho (relief) ni nari (become) masu" and a counter utterance reading "On (tone) chi (deaf) da to (when being) tsu ra ku nari (becomes tough) masu (is)".

The generation model learning unit 20 learns a generation model which generates a counter utterance from an input utterance by taking an argumentative scheme into consideration using the pair data constituted by the argumentative scheme-added input utterance and the counter utterance 122 having been input from the argumentative scheme adding unit 10 and generates the counter utterance generation model 123.

For example, a Conditinal Variational Auto Encoder (CVAE) capable of conditional generation is utilized to learn the generation model. The CVAE is a model which enables, by applying labels to an Encoder (a portion that converts an input sequence into a vector) and a Decoder (a portion that converts a vector into an output sequence) of a generation model, output to be controlled in accordance with a label input together with the input sequence during generation.

For details on CVAE, for example, refer to the following document.

Kihyuk Sohn, et al., "Learning structured output representation using deep conditional generative models", In Advances in Neural Information Processing Systems, 2015, pages 34833491

For details on learning methods, for example, the following document can be referred to and a program called "cvae_run.py" can be applied.

Internet <URL: https://github.com/claude-zhou/Moji-Talk>

A tool used to implement CVAE is not particularly limited and known tools may be used. For details on a tool for implementing CVAE, for example, refer to the following document.

Internet <URL: https://github.com/claude-zhou/Moji-Talk>

For example, the generation model learning unit 20 learns a generation model which generates a counter utterance from an input utterance by taking an argumentative scheme into consideration using the pair data constituted by the argumentative scheme-added input utterance and the counter utterance 122 shown in FIG. 4 and generates the counter utterance generation model 123.

The counter utterance generating unit 30 uses the counter utterance generation model 123 to generate and output a predetermined counter utterance based on an input utterance of a user and a designated argumentative scheme. Using the counter utterance generation model 123 enables the counter utterance generating unit 30 to output a counter utterance (a counter utterance in accordance with the methodology of argumentation) on which the designated argumentative scheme is reflected. In other words, due to the generation model learning unit 20 generating the counter utterance generation model 123 using the pair data constituted by the argumentative scheme-added input utterance and the counter utterance 122, the counter utterance generating unit 30 is capable of generating a counter utterance in accordance with the methodology of argumentation. It should be noted that the argumentative scheme may be designated by the user or may be set in advance.

For example, when the user designates "a rebuttal based on a comparison: comparison" as an argumentative scheme, the counter utterance generating unit 30 generates a counter utterance on which a rebuttal based on a comparison is reflected. For example, when the user designates "a rebuttal based on an exception: exception" as an argumentative scheme, the counter utterance generating unit 30 generates a counter utterance on which a rebuttal based on an exception is reflected. For example, when the user designates "a rebuttal based on popular opinion: people" as an argumentative scheme, the counter utterance generating unit 30 generates a counter utterance on which a rebuttal based on popular opinion is reflected. For example, when the user designates "a rebuttal based on whether a consequence is right or wrong: consequence" as an argumentative scheme, the counter utterance generating unit 30 generates a counter utterance on which a rebuttal based on whether a consequence is right or wrong is reflected.

First, the counter utterance generating unit 30 performs word segmentation processing on an input utterance of the user. For example, a learned model created by training sentencepiece described earlier can be used as a tool for applying the word segmentation processing.

Figure 5:
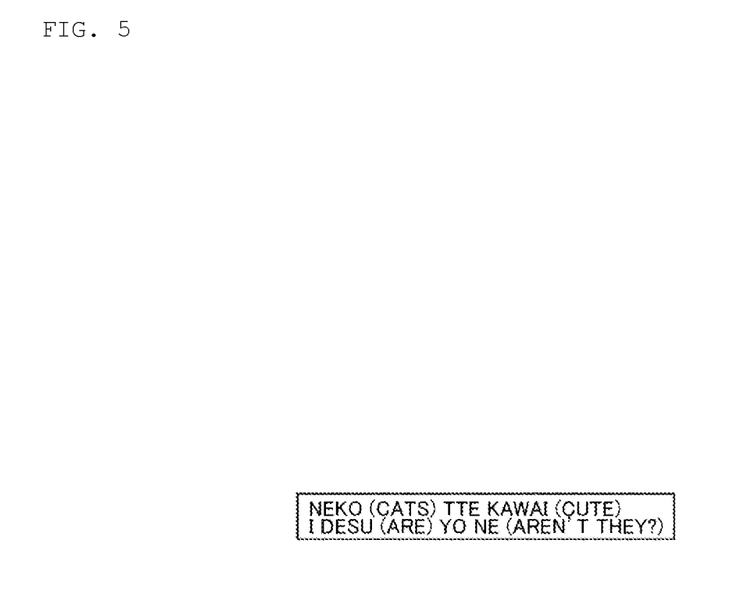
FIG. 5 is a diagram showing an example of an input utterance of a user subjected to word segmentation processing according to the present embodiment.

FIG. 5 is a diagram showing an example of an input utterance of a user having been subjected to word segmentation processing. For example, when the input utterance of the user states that "Cats are cute, aren't they?", the input utterance of the user subjected to word segmentation processing is "Neko (cats) tte kawai (cute) i desu (are) yo ne (aren't they?)".

Figure 6:
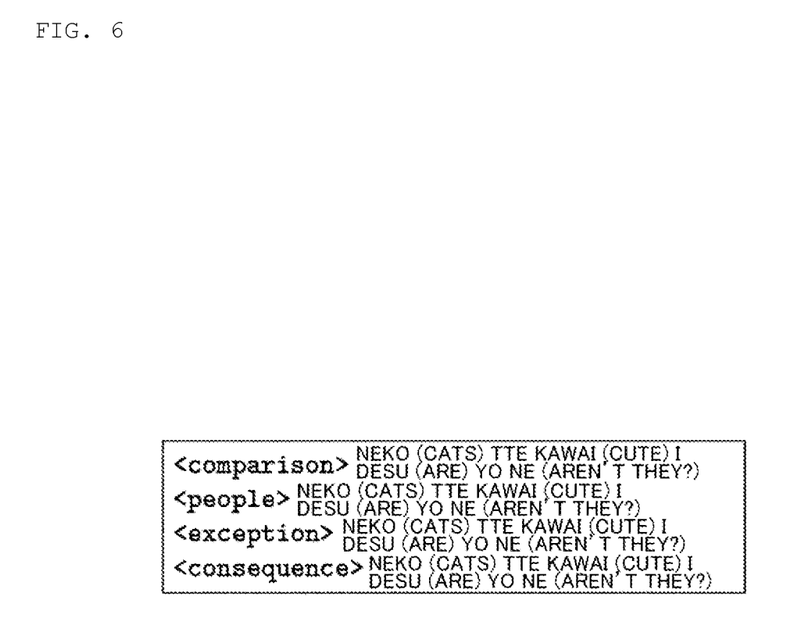
FIG. 6 is a diagram showing examples of input text data according to the present embodiment.

Next, as shown in FIG. 6, the counter utterance generating unit 30 adds a label of a designated argumentative scheme to the input utterance of the user having been subjected to word segmentation processing to generate input text data. The counter utterance generating unit 30 inputs the generated input text data to the counter utterance generation model 123.

FIG. 6 is a diagram showing examples of an input to the counter utterance generating unit. For example, a case where the input utterance of the user is the utterance "Cats are cute, aren't they?" will be described as an example.

For example, when the designated argumentative scheme is Argument from opposites (a rebuttal based on a comparison: comparison), the label <comparison> is added to the top of the input text data so that the input text data is expressed as "<comparison> Neko (cats) tte kawai (cute) i desu (are) yo ne (aren't they?)".

For example, when the designated argumentative scheme is Argument from popular opinion (a rebuttal based on popular opinion: people), the label <people> is added to the top of the input text data so that the input text data is expressed as "<people> Neko (cats) tte kawai (cute) i desu (are) yo ne (aren't they?)".

For example, when the designated argumentative scheme is Argument from exception (a rebuttal based on an exception: exception), the label <exception> is added to the top of the input text data so that the input text data is expressed as "<exception> Neko (cats) tte kawai (cute) i desu (are) yo ne (aren't they?)".

For example, when the designated argumentative scheme is Argument from consequences (a rebuttal based on whether a consequence is right or wrong: consequence), the label <consequences> is added to the top of the input text data so that the input text data is expressed as "<consequences> Neko (cats) tte kawai (cute) i desu (are) yo ne (aren't they?)".

Next, using the counter utterance generation model 123 input from the generation model learning unit 20, the counter utterance generating unit 30 generates a counter utterance on which the designated argumentative scheme is reflected and outputs the generated counter utterance to the output unit 300.

Figure 7:
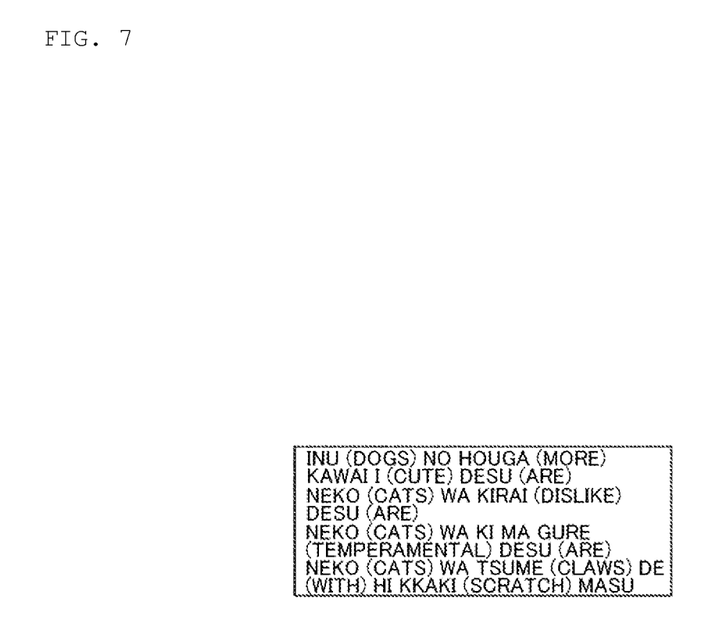
FIG. 7 is a diagram showing examples of a counter utterance output by a generation apparatus according to the present embodiment.

FIG. 7 is a diagram showing examples of a counter utterance output by the counter utterance generating unit 30. For example, a case where the input utterance of the user is the utterance "Cats are cute, aren't they?" will be described as an example.

For example, in accordance with the designated argumentative scheme Argument from opposites (a rebuttal based on a comparison), the counter utterance generating unit 30 generates a counter utterance stating that "Inu (dogs) no houga (more) kawai i (cute) desu (are)" as "a rebuttal based on a comparison" with respect to the input utterance of the user stating that "Cats are cute, aren't they?". In other words, as shown in FIG. 7, the counter utterance output from the counter utterance generating unit 30 is a counter utterance on which the label <comparison> of the argumentative scheme is reflected and is an utterance indicating a rebuttal as a result of a comparison stating that "Compared to cats, dogs are cuter".

For example, in accordance with the designated argumentative scheme Argument from popular opinion (a rebuttal based on popular opinion), the counter utterance generating unit 30 generates a counter utterance stating that "Neko (cats) wa kirai (dislike) desu (are)" as "a rebuttal based on public opinion" with respect to the input utterance of the user stating that "Cats are cute, aren't they?". In other words, as shown in FIG. 7, the counter utterance output from the counter utterance generating unit 30 is a counter utterance on which the label <opinion> of the argumentative scheme is reflected and is an utterance indicating a rebuttal based on a public opinion stating that "Some people dislike cats".

For example, in accordance with the designated argumentative scheme Argument from exception (a rebuttal based on an exception), the counter utterance generating unit 30 generates a counter utterance stating that "Neko (cats) wa ki ma gure (temperamental) desu (are)" as "a rebuttal based on an exception" with respect to the input utterance of the user stating that "Cats are cute, aren't they?". In other words, as shown in FIG. 7, the counter utterance output from the counter utterance generating unit 30 is a counter utterance on which the label <exception> of the argumentative scheme is reflected and is an utterance indicating a rebuttal based on an exception stating that "Cats can be temperamental and exceptionally not cute".

For example, in accordance with the designated argumentative scheme Argument from consequences (a rebuttal based on whether a consequence is right or wrong), the counter utterance generating unit 30 generates a counter utterance stating that "Neko (cats) wa tsume (claws) de (with) hi kkaki (scratch) masu" as "a rebuttal based on whether a consequence is right or wrong" with respect to the input utterance of the user stating that "Cats are cute, aren't they?". In other words, as shown in FIG. 7, the counter utterance output from the counter utterance generating unit 30 is a counter utterance on which the label <consequence> of the argumentative scheme is reflected and is an utterance indicating a rebuttal based on whether a consequence is right or wrong stating that "An uncute feature of cats is that they scratch".

It should be noted that a designated argumentative scheme input together with an input utterance of the user to the counter utterance generation model is not limited to one argumentative scheme and a plurality of argumentative schemes may be combined. For example, by combining the label <people> of a designated argumentative scheme and the label <consequence> of a designated argumentative scheme with each other, the counter utterance generating unit 30 can also generate a complex counter utterance stating that "I don't like cats+because+cats scratch with their claws".

Using a counter utterance generation model learned using pair data constituted by an argumentative scheme-added input utterance and a counter utterance, the generation apparatus 100 according to the present embodiment is capable of generating a counter utterance in accordance with a methodology of argumentation. A dialogue system capable of engaging in a discussion intended by the user can be realized by utilizing the generation apparatus 100.

In addition, by using the counter utterance generation model, the generation apparatus 100 according to the present embodiment can robustly generate a counter utterance with respect to an arbitrary input utterance and can improve an accuracy rate of the generated counter utterance. Furthermore, an output utterance can be controlled with respect to various input utterances when generating an utterance in an argumentative dialogue and a supportive utterance or a rebuttal can be made using different methodologies of argumentation in accordance with a state of the argumentation. As a result, considering methodologies of argumentation that are optimal in the long term, a dialogue system that engages in a discussion while combining such methodologies can be constructed. For example, by initially generating a rebuttal (for example, product A is not favorable in terms of . . . ) that cites faults with respect to an assertion made by an opposite party and subsequently generating a rebuttal (for example, product B is more favorable than product A in terms of . . . ) using an opposing candidate, an application of the generation apparatus 100 to marketing of a predetermined product (for example, product B) to the opposite party is also conceivable.

<Generation Method>

Next, an example of a generation method according to the present embodiment will be described with reference to FIG. 8.

In step S101, the argumentative scheme adding unit 10 adds an argumentative scheme to the pair data constituted by an input utterance and a counter utterance 121 to generate the pair data constituted by an argumentative scheme-added input utterance and the counter utterance 122.

Specifically, the argumentative scheme adding unit 10 selects an argumentative scheme to be added to the pair data constituted by the input utterance and the counter utterance 121 from a plurality of argumentative schemes based on a decision rule and adds the argumentative scheme to the pair data constituted by the input utterance and the counter utterance 121.

In step S102, the generation model learning unit 20 learns a generation model which generates a counter utterance from an input utterance by taking an argumentative scheme into consideration using the pair data constituted by the argumentative scheme-added input utterance and the counter utterance 122 having been input from the argumentative scheme adding unit 10 as learning data and generates the counter utterance generation model 123.

Specifically, for example, the generation model learning unit 20 generates the counter utterance generation model 123 using the pair data constituted by the argumentative scheme-added input utterance and the counter utterance 122 shown in FIG. 4.

In step S103, the counter utterance generating unit 30 uses the counter utterance generation model 123 to generate a predetermined counter utterance based on an input utterance of the user and a designated argumentative scheme, and outputs the generated counter utterance. In other words, the counter utterance generating unit 30 inputs the input utterance of the user and the designated argumentative scheme and outputs a predetermined counter utterance using the counter utterance generation model 123.

According to the generation method described above, using a counter utterance generation model learned using pair data constituted by an argumentative scheme-added input utterance and a counter utterance, a counter utterance can be generated in accordance with a methodology of argumentation.

<Modification>

The present invention is not limited to the embodiment described above and modifications thereof. For example, the various types of processing described above may not only be executed in chronological order according to descriptions thereof provided above but may also be executed in parallel or on an individual basis in accordance with processing capabilities of an apparatus to be used to execute the processing or as may be necessary. Furthermore, the present invention can be appropriately modified without departing from the scope and spirit of the invention.

<Program and Recording Medium>

A computer capable of executing program instructions to cause the computer to function as the embodiment described above and modifications thereof can also be used. The computer may store a program describing processing contents for realizing functions of various apparatuses in a storage unit of the computer and realize the functions by having a processor of the computer read and execute the program, or at least a part of the processing contents may be realized by hardware. In this case, the computer may be a general-purpose computer, a dedicated computer, a work station, a PC, an electronic notepad, or the like. The program instructions may be program codes, code segments, or the like for executing necessary tasks. The processor may be a CPU (Central Processing Unit), a GPU (Graphics Processing Unit), a DSP (Digital Signal Processor), an ASIC (Application Specific Integrated Circuit), or the like.

Figure 8:
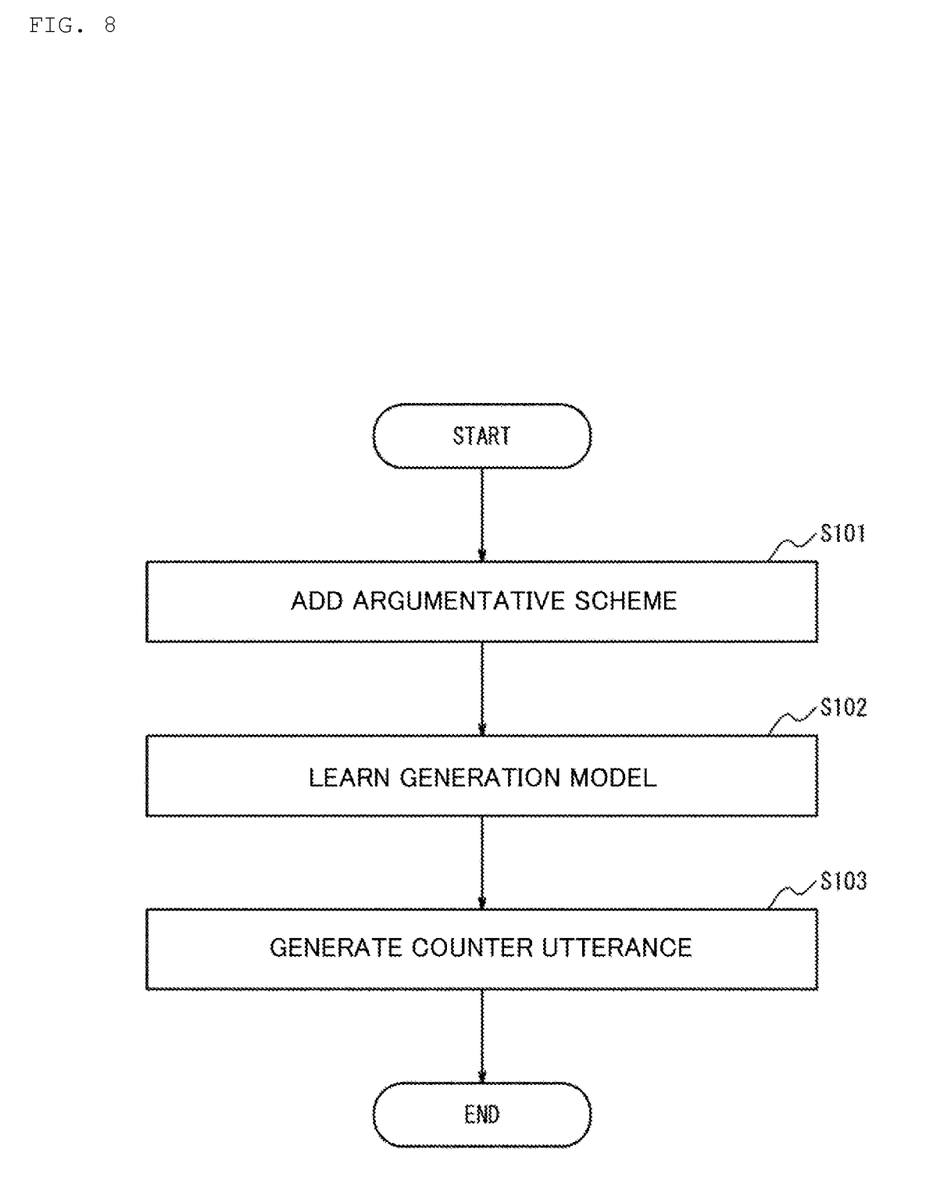
FIG. 8 is a flow chart showing an example of a generation method according to the present embodiment.

For example, referring to FIG. 8, a program for causing a computer to execute the generation method described above includes: an argumentative scheme adding step S101 of adding an argumentative scheme with respect to pair data constituted by an input utterance and a counter utterance that voices a negative opinion with respect to the input utterance and generating argumentative scheme-added pair data; a generation model learning step S102 of learning a generation model for generating a counter utterance from an input utterance in consideration of the argumentative scheme by using the argumentative scheme-added pair data as learning data and generating a learned counter utterance generation model; and a counter utterance generating step S103 of inputting an input utterance of a user and a designated argumentative scheme and outputting a counter utterance using the counter utterance generation model.

In addition, the program may be recorded in a computer-readable recording medium. Such a recording medium can be used to install the program onto the computer. In this case, the recording medium on which the program is recorded may be a non-transitory recording medium. The non-transitory recording medium may be a CD (Compact Disk)-ROM (Read-Only Memory), a DVD (Digital Versatile Disc)-ROM, a BD (Blu-ray (registered trademark) Disc)-ROM, or the like. Furthermore, the program can also be provided by download via a network.

While the embodiment presented above has been described as a representative example, it will be obvious to a person skilled in the art that many modifications and replacements can be made within the spirit and the scope of the present disclosure. Therefore, the present invention should not be understood as being limited by the embodiment described above, and various modifications and changes may be made without departing from the scope of the appended claims. For example, the plurality of constituent blocks described in configuration diagrams of the embodiment may be combined into a single constituent block or a single constituent block may be divided into a plurality of constituent blocks.

REFERENCE SIGNS LIST

1 Dialogue system
10 Argumentative scheme adding unit
20 Generation model learning unit
30 Counter utterance generating unit
100 Generation apparatus
110 Control unit
120 Storage unit
121 Pair data constituted by an input utterance and a counter utterance
122 Pair data constituted by an argumentative scheme-added input utterance and a counter utterance
123 Learned counter utterance generation model
200 Input unit
300 Output unit

The invention claimed is:

1. A generation apparatus, comprising:
circuitry configured to:
    add a plurality of argumentative schemes with respect to pair data constituted by input utterances and counter utterances, each counter utterance voicing a rebuttal with respect to a corresponding one of the input utterances and the pair data generates argumentative scheme-added pair data;
    for each argumentative scheme, learn a generation model for generating a counter utterance from an input utterance in consideration of the argumentative scheme by using the argumentative scheme-added pair data as learning data and generate a learned counter utterance generation model;
    receive a user designation of an argumentative scheme among a plurality of argumentative schemes; and
    acquire an input utterance of the user and the user designated argumentative scheme and output a counter utterance using the respective counter utterance generation model,
wherein the plurality of argumentative schemes include:
    a rebuttal based on a comparison,
    a rebuttal based on an exception,
    a rebuttal based on popular opinion, and
    a rebuttal based on whether a consequence is right or wrong.

2. The generation apparatus according to claim 1, wherein the circuitry is configured to perform word segmentation processing with respect to the input utterance of the user, generates input text data in which the user designated argumentative scheme is added to the input utterance of the user having been subjected to the word segmentation processing, and inputs the input text data to the respective counter utterance generation model.

3. The generation apparatus according to claim 1, wherein the generation model learning unit uses a Conditional Variational Auto Encoder (CVAE) as the generation model.

4. A generation method comprising the steps of:
adding a plurality of argumentative schemes with respect to pair data constituted by input utterances and counter utterances, each counter utterance voicing a rebuttal with respect to a corresponding one of the input utterances and the pair data generating argumentative scheme-added pair data;
for each argumentative scheme, learning a generation model for generating a counter utterance from an input utterance in consideration of the argumentative scheme by using the argumentative scheme-added pair data as learning data and generating a learned counter utterance generation model;
receiving a user designation of an argumentative scheme among a plurality of argumentative schemes; and acquiring an input utterance of the user and the user designated argumentative scheme and outputting a counter utterance using the respective counter utterance generation model, wherein the plurality of argumentative schemes include:
- a rebuttal based on a comparison,
- a rebuttal based on an exception,
- a rebuttal based on popular opinion, and
- a rebuttal based on whether a consequence is right or wrong.

5. The generation method according to claim 4, wherein the step of generating a counter utterance includes performing word segmentation processing with respect to the input utterance of the user, generating input text data in which the user designated argumentative scheme is added to the input utterance of the user having been subjected to the word segmentation processing, and inputting the input text data to the respective counter utterance generation model.

6. A non-transitory computer readable storage medium comprising computer executable program code configured to instruct a computer to perform the method according to claim 4.

* * * * *